United States Patent
Gember-Jacobson et al.

(10) Patent No.: US 9,705,785 B2
(45) Date of Patent: Jul. 11, 2017

(54) CLOUD ARCHITECTURE WITH STATE-SAVING MIDDLEBOX SCALING

(71) Applicant: Wisconsin Alumni Research Foundation, Madison, WI (US)

(72) Inventors: Aaron Robert Gember-Jacobson, Madison, WI (US); Srinivasa Aditya Akella, Middleton, WI (US); Chaithan M. Prakash, Madison, WI (US); Raajay Viswanathan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 180 days.

(21) Appl. No.: 14/577,418

(22) Filed: Dec. 19, 2014

(65) Prior Publication Data
US 2016/0182360 A1 Jun. 23, 2016

(51) Int. Cl.
*H04L 12/707* (2013.01)
*H04L 12/861* (2013.01)
*G06F 9/455* (2006.01)

(52) U.S. Cl.
CPC .......... *H04L 45/22* (2013.01); *G06F 9/45533* (2013.01); *G06F 9/45558* (2013.01); *H04L 49/9063* (2013.01); *G06F 2009/4557* (2013.01); *G06F 2009/45562* (2013.01)

(58) Field of Classification Search
CPC ... G06F 2009/4557; G06F 2009/45595; G06F 9/45558; H04L 45/74; H04W 80/04
See application file for complete search history.

(56) References Cited

U.S. PATENT DOCUMENTS

| | | | |
|---|---|---|---|
| 7,975,071 B2 * | 7/2011 | Ramjee | H04L 67/2828 370/352 |
| 9,304,801 B2 * | 4/2016 | Koorevaar | H04L 63/20 |

OTHER PUBLICATIONS

Shriram Rajagopalan et al.: Split/Merge: System Support for Elastic Execution in Virtual Middleboxes; 10th USENIX Symposium on Networked Systems Design and Implementation (NSDI '13); pp. 227-240; Watson Research Center, Yorktown Heights, NY; University of British Columbia, Vancouver, Canada.
Aaron Gember; Abstractions for Network Function Control; Power Point; Whole Document; pp. 1-21; US.

\* cited by examiner

*Primary Examiner* — Chandrahas Patel
(74) *Attorney, Agent, or Firm* — Boyle Fredrickson, S.C.

(57) ABSTRACT

An enterprise computer system efficiently adjusts the number of middleboxes associated with the the enterprise, for example, with changes in demand, by transferring not only flows of instructions but also middlebox states associated with those flows. Loss-less transfer preventing the loss of packets and its state, and order-preserving transfer preserving packet ordering may be provided by a two-step transfer process in which packets are buffered during the transfer and are marked to be processed by a receiving middlebox before processing by that middlebox of ongoing packets for the given flow.

14 Claims, 2 Drawing Sheets

CLOUD ARCHITECTURE WITH STATE-SAVING MIDDLEBOX SCALING

STATEMENT REGARDING FEDERALLY SPONSORED RESEARCH OR DEVELOPMENT

This invention was made with government support under 1302041 and 1040757 awarded by the National Science Foundation. The government has certain rights in the invention.

CROSS REFERENCE TO RELATED APPLICATION

BACKGROUND OF THE INVENTION

The present invention relates to cloud-based computing, in which computer resources are provided in a scalable fashion as virtual machines executing on an array of computers, and in particular to a method of implementing "middlebox" functionality in such cloud-based systems with flexible scaling in a manner consistent with cloud-based computing.

"Middleboxes" are important components of large computer installations and service provider networks having multiple computers executing applications such as Web servers, application servers, file servers or databases or the like (enterprises). In this environment, middleboxes provide for network related functions such as protecting the network and its applications from attacks (e.g., intrusion detection systems (IDS) and firewalls) and enhancing network efficiency (e.g., load balancers, WAN optimizers, and the like). Most simply, middleboxes may be directly wired in the path of data to the enterprise computers with which they are associated. Middleboxes may be similarly installed by programming network switches used to control interconnections on the network joining the middleboxes and application computers.

Cloud computing provides a computer system architecture in which computing resources are provided on demand in the form of virtual and/or actual machines that are flexibly allocated to multiple enterprises as demand requires. A cloud application manages the machines so that users of the cloud can acquire additional machines at periods of high demand and return those machines when the demand drops. By aggregating many users, significant economy of scale may be realized in terms of maintenance of the hardware, provision of physical resources such as power and cooling, and smoothing of peak demands.

It is known how to implement middlebox functions on virtual machines implemented in a cloud computing system. Unlike the scaling of other processes, however, it can be difficult to scale middlebox functions in a way that satisfies performance standards ("service level agreements") and minimizes operating costs without adversely affecting the accuracy of the middlebox functions.

SUMMARY OF THE INVENTION

The present invention provides a system that allows flexible and effective scaling of middlebox functions by providing a mechanism to transfer among middlebox instances, not only network traffic flows but also the middlebox states associated with those flows. By transferring flow related states, scaling may be accomplished on demand without significant loss of accuracy in the middlebox functions.

Generally, the present invention provides a computing system having a plurality of switch-connected computers implementing virtual machines intercommunicating data using packet flows. The computing system includes a central controller dynamically allocating machines to a given enterprise and at least a first and second middlebox receiving a packet flow and collecting state information with respect to the flow, the state information used for processing the packets received by the middleboxes, the first and second middleboxes being instances created from a common virtual machine image. The computing system operates to (i) receive instructions to change a number of middleboxes and identify a given packet flow received by the first middlebox; (ii) in response to the instructions, transfer state data of the first middlebox related to the given flow to the second middlebox; and (iii) in response to the instructions, control the switches to transfer ongoing packets of the given flow to the second middlebox.

It is thus a feature of at least one embodiment of the invention to permit rapid scaling of middleboxes in order to satisfy service level agreements without the need to wait for current flows to abate or to suffer reduced accuracy while states are rebuilt at the new middleboxes. By transferring the flow related state, new middleboxes may be rapidly brought online and old middleboxes deleted with reduced loss of state.

The computing system may further begin buffering packets of the flow to the first middlebox before step (ii) and transfer the buffered packets for the given flow to the second middlebox after step (ii).

It is thus a feature of at least one embodiment of the invention to avoid packet loss during the state transfer process.

The second middlebox may begin processing the transferred packets before processing ongoing packets of the given flow received by the second middlebox.

It is thus a feature of at least one embodiment of the invention to preserve the order of the packets during the transfer process by processing the buffered packets at the second middlebox before processing ongoing packets of the given flow at the second middlebox.

The second middlebox may provide separate storage locations for the buffered packets and the ongoing packets of the given flow received by the second middlebox.

It is thus a feature of at least one embodiment of the invention to provide a simple method of preserving the ordering of the packets irrespective of arrival time at the second middlebox.

The buffered packets may be marked to distinguish them from ongoing packets of the given flow received by the second middlebox.

It is thus a feature of at least one embodiment of the invention to provide a set ordering marking on the packets themselves to eliminate the need for special transmission requirements.

The second middlebox may receive an indication of a last buffered packet to initiate processing of the ongoing packets of the given flow.

It is thus a feature of at least one embodiment of the invention to provide an ordering system that accommodates possible delays in packet receipt at the first middlebox after the packet flow is switched to the second middlebox.

The last buffered packet may be a last packet of the flow received by the first middlebox after a completion of the transfer of the state data of the first middlebox related to the given flow to the second middlebox.

It is thus a feature of at least one embodiment of the invention to provide a simple method of determining a last packet at the first middlebox.

Alternatively the last packet may be a tracer packet transmitted by the computer system to the first middlebox after controlling the switch to transfer ongoing data packets of the given flow to the second middlebox.

It is thus a feature of at least one embodiment of the invention to provide a method of detecting a last packet in the presence of a lossy network where packets may be lost.

The first middlebox, upon initiation of the transfer of state data related to the given flow to the second middlebox, may cease collecting state information with respect to the flow.

It is thus a feature of at least one embodiment of the invention to prevent the corruption of state data during the transfer process.

The computing system may further instantiate the first middlebox upon receipt of the instructions.

It is thus a feature of at least one embodiment of the invention to provide a system for scaling up middlebox functionality.

Alternatively, the computing system may de-instantiate the second middlebox upon the buffering of packets.

It is thus a feature of at least one embodiment of the invention to confer the same benefits to scaling down of middlebox functionality.

The instructions to change the number of middleboxes for a given flow of data packets may provide at least one flow identification value contained in the packets.

It is thus a feature of at least one embodiment of the invention to provide a simple method of identifying flows that may also be used to partition state information that should be transferred with those flows.

Alternatively or in addition, the instructions to change the number of middleboxes for a given flow of data provide at least one port number associated with the flows.

It is thus a feature of at least one embodiment of the invention to provide a versatile method of identifying a flow and partitioning flows by port number.

Each middlebox may be associated with a different virtual electronic computer having a unique virtual processor and memory.

It is thus a feature of at least one embodiment of the invention to provide a system that may be used to control the number of virtual machines dedicated to a given enterprise.

The common virtual machine object is selected from the group consisting of: an intrusion detection system, a proxy cache, a wide area network optimizer, and a load balancer.

It is thus a feature of at least one embodiment of the invention to provide a system that can work with a wide variety of different middlebox types having proprietary internal state mechanisms.

These particular objects and advantages may apply to only some embodiments falling within the claims and thus do not define the scope of the invention.

DETAILED DESCRIPTION OF THE PREFERRED EMBODIMENT

Figure 1:
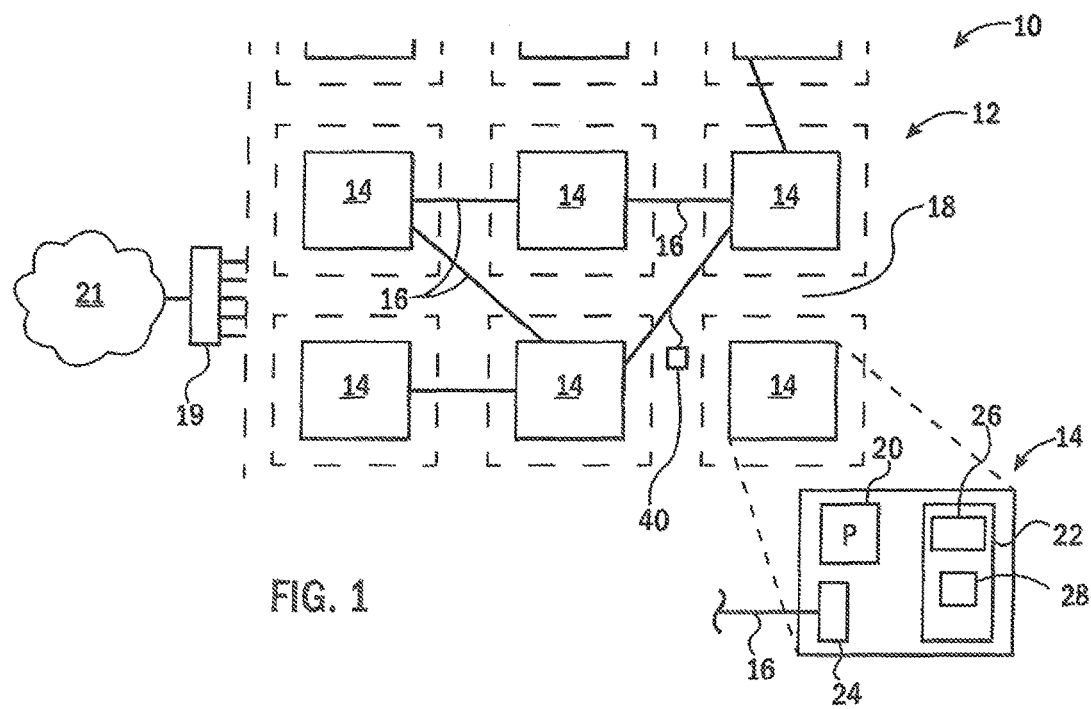
FIG. 1 is a simplified representation of an array of computers interconnected by switches, for example, in a cloud-based processing network such as may provide a set of virtual machines organized in enterprises, each virtual machine providing a virtual processor and memory as managed by a cloud application in real time.

Referring now to FIG. 1, a cloud-computing facility 10 may provide for a set of server racks 12 each holding multiple electronic computers 14 intercommunicating on a network 16. The network 16, for example, may be managed by network switches 18 represented here as an intervening matrix in dotted lines. The network switches 18 may connect with one or more routers 19 to an external network such as the Internet 21 or the like. Generally, the cloud computer facility may, for example, provide "Infrastructure as a Service" (Iaas) functionality.

As is understood in the art, each of the electronic computers 14 may provide a processor 20 having one or more cores, a memory system 22 including RAM and disk or other memory, and a network card 24 for interconnecting to the network 16. The memory system 22 may include an operating system 26, for example, allowing virtualization, and virtual machine software 28, for example, implementing a virtual application computer or a virtual middlebox.

The virtual middleboxes implemented by the virtual machine software 28 may provide network functions (NF) such as, but not limited to, an intrusion detection system (IDS), a proxy server; a wide area network (WAN) optimizer, and a load balancer. Generally each virtual middlebox will be on a separate virtual electronic computer appealing as if it has its own processor 20 and dedicated memory system 22 by virtue of a virtualizing operating systems such as a hypervisor.

As is generally understood in the art, a WAN optimizer middlebox may implement a variety of optimization techniques to increase data transmission efficiencies over the network to the electronic computers 14, for example, by eliminating redundant data transfer, compression of data, caching and the like. An IDS middlebox may monitor traffic flowing over the network to detect malware or network intrusions or the like. A load balancer middlebox may distribute requests by users to the various application machines while preserving consistent communication threads with any given user. A proxy server may fetch web objects on behalf of web clients and cache these objects to serve later web requests. In order to operate, an IDS may generate a state extracted from multiple packets of the given flow, for example, to create a signature and to compare that signature against a whitelist or blacklist. Other middlebox functions such as proxy servers, WAN optimizers, and load balancers, extract states from flows of packets in order to associate new packets with a given flow and, for example, destination.

Figure 2:
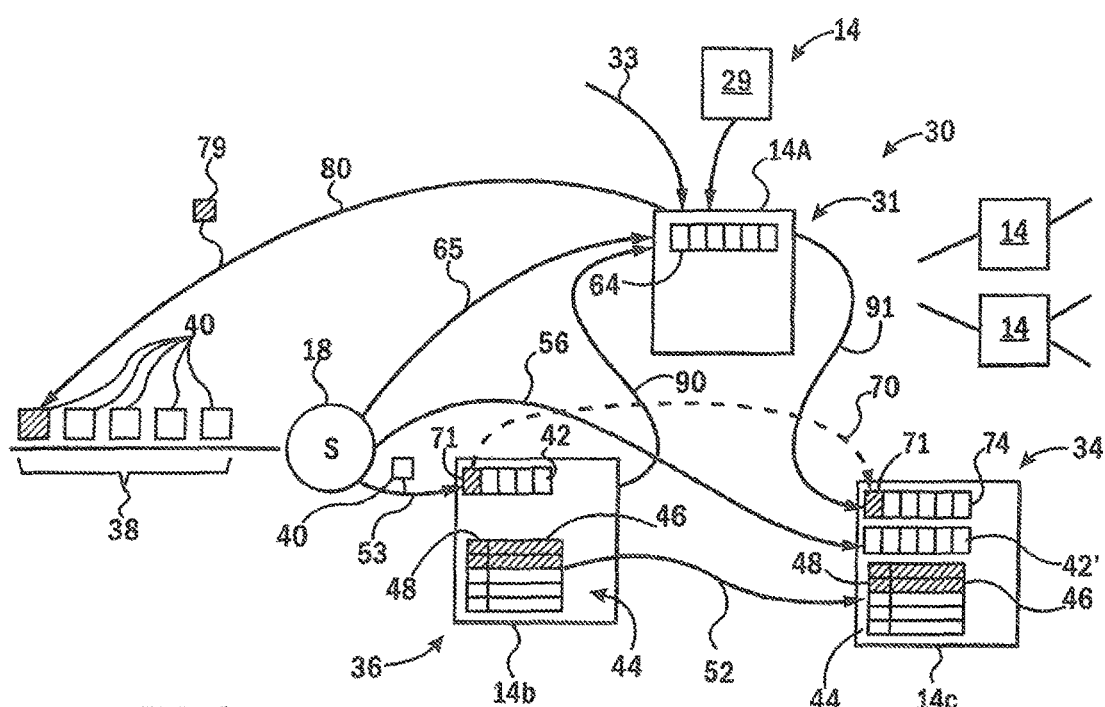
FIG. 2 is a block diagram of the flows of data during a scaling operation where a middlebox function is sealed up or down.
Figure 3:
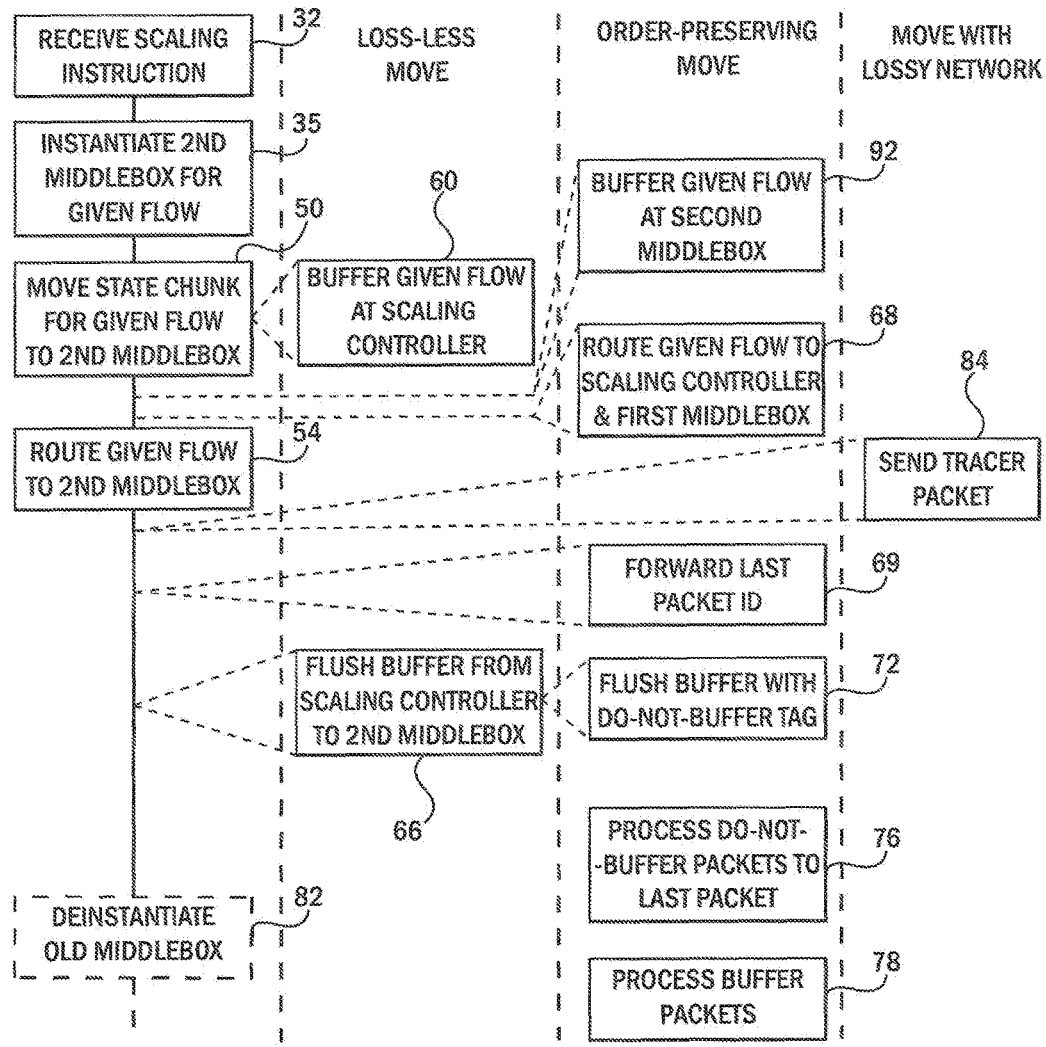
FIG. 3 is a flowchart showing multiple embodiments of the steps of the present invention, the embodiments providing respectively, for state transfer, loss-less transfer, and order-preserving transfer.

Referring now to FIGS. 2 and 3, the present invention may provide a computing system 30 of multiple virtual machines executing on one or more electronic computers 14 that may control and implement middlebox functions for multiple other electronic computers 14. In one example, first electronic computer 14a may provide a first virtual machine supporting a scaling controller 31 that may work with virtual machines on electronic computers 14b and 14c to scale up a number of middleboxes serving the other electronic computers 14. Each virtual machine will be described with respect to a different electronic computer 14; however, it will be understood that multiple virtual machines may in fact be on one electronic computer 14.

Middlebox Scaling

At process block 32, a scaling controller 31 may receive a scaling instruction 33, for example, from a user or a program that monitors and allocates computational resources to a particular enterprise. The scaling instruction 33 will indicate a middlebox that needs to have a new instance or an instance removed and will identify packet flows that will be rerouted to be associated with the new middlebox or to be removed from the old discontinued middlebox.

Scaling up Middlebox Functionality

In the case where the scaling instruction 33 requests an increase in a network function currently implemented by another virtual machine (for example, middlebox 36 implemented by computer 14b), upon receiving this instruction at process block 32, the scaling controller 31 will request a central controller 29 (normally part of the proprietary cloud infrastructure) to instantiate in a new virtual machine (in this example, on electronic computer 14c) a second middlebox 34 identical to an existing middlebox 36 implemented in a virtual machine on electronic computer 14b. Basically this instantiation reproduces the necessary virtual machine software 28 in the new virtual machine to implement the desired middlebox function and also copies static state (e.g., configuration state) from the first middlebox 36 to the second middlebox 34.

At this time, middlebox 36 will be receiving a flow 38 of packets 40 through the network switch 18. At the time of the instruction 33, packets 40 of the flow 38 will continue to be buffered in a middlebox buffer 42 and processed according to the function of the middlebox 36 which includes generating state information in data structure 44 in memory 22. The data structure 44 may be organized in a variety of different ways including, for example, hash tables, trees, etc., and include different proprietary state information but will be divisible into a number of state chunks 46 each associated with a flow identifier 48, including one flow identifier 48 describing given flow 38. A flow identifier 48, for example, may describe a particular TCP or UDP or ICMP connection, or data to or from particular port number, or a particular source or destination address, or a collection of such flows.

Scaling controller 31 may then provide commands to middlebox 36, as indicated by process block 50, to move the state chunks 46 associated with the flow 38 to a corresponding data structure 44 of middlebox 34. This command from the scaling controller 31 does not require intimate knowledge of how the data structure 44 is organized. It is only required that the given middlebox 36 be able to communicate with another instantiated version of itself to make this transfer. Thus the system is flexible to a wide variety of different network functions.

In the simplest embodiment, at the time of this transfer of state chunk 46 along network, path 52, incoming packets 40 along network path 53 from the flow 38 associated with the transferred state chunk 46 from the switch 18 to the middlebox 36 may be discarded so as not to corrupt the state chunk 46.

At the conclusion of the transfer of state chunk 46 as indicated by process block 54, scaling controller 31 may instruct the switch 18 to send further packets 40 associated with the flow 38 along path 56 directly to middlebox 34 to be received by middlebox buffer 4T of middlebox 34. By transferring state chunk 46, middlebox 34 minimizes the loss of functionality by providing substantially complete state information to middlebox 36.

Loss-Free Move

Referring still to FIGS. 2 and 3, in a loss-less embodiment, at process block 50, in which the state chunk 46 is moved from middlebox 36 to middlebox 34, flow 38 along network path 53 to middlebox 34 may be buffered as indicated by process block 60, for example, in a controller buffer 64 in the scaling controller 31.

This buffering may be accomplished by sending a command to middlebox 36, as indicated by process block 60, to send packets 40 that are &queued from middlebox buffer 42 to the scaling controller 31 along network path 90. The packets 40 are not processed by middlebox 36. The scaling controller 31 places the packets 40 in controller buffer 64.

By using the controller buffer 64. packets 40 that will be disregarded by middlebox 36 after the beginning of the movement of state chunk 46 to middlebox 34 will be preserved to be later processed by middlebox 34.

At process block 66, after conclusion of the transfer of state chunk 46 per process block 50, and optionally after the scaling controller 31 instructs the switch 18 to route the flow 38 to middlebox 34 per process block 50, controller buffer 64 may be flushed to middlebox 34 over network connection 91 so that data is not lost. Alternatively, controller buffer 64 may be flushed to the switch 18 over network connection 65 with an instruction for the switch 18 to send the packets 40 from controller buffer 64 along network path 56 to middlebox 34.

Order-Preserving Move

Referring to still to FIGS. 2 and 3, in an order-preserving move of the state chunk 46, the steps implemented in the loss-less move described above may be augmented by process block 92 and process block 68 occurring after the state chunk move of process block 50.

At process block 92, the scaling controller 31 sends a command to middlebox 34 to buffer packets 40 of flow 38 arriving at middlebox 34 along network path 56 from switch 18 in middlebox buffer 42' and not yet process these packets according to the function of the middlebox 34.

At process block 68, the scaling controller 31 instructs the switch 18 to transmit packets 40 of the flow 38 both along network path 53 to middlebox 36 and transmit packet copies 40 of packets 40 of the flow 38 over network connection 65 to the scaling controller 31.

When the scaling controller 31 begins to receive the packet copies 40' over network connection 65. the scaling controller 31 instructs the switch 18 to route the flow 38 exclusively to middlebox 34 per process block 50. In addition, the scaling controller 31 tracks the packet copies 40' arriving from the switch 18 along network connection 65. This allows the scaling controller 31 to identify the last packet copy 71 of the flow 38 received by the scaling controller 31.

The middlebox 36 continues to send packets 40 of the flow 38 that are dequeued from middlebox buffer 42 to the scaling controller 31 over network connection 90 (per process block 60), The packets 40 are not processed by middlebox 36. The sealing controller 31 places the packets 40 in controller buffer 64.

At process block 66, after the last packet 71 of the flow 38 is placed in controller buffer 64 per process block 60, controller buffer 64 may be flushed to middlebox 34 over network connection 91 so that data is not lost. The last packet 71 of the flow 38 may be determined by the scaling controller 31 by comparing the packets 40 arriving at the scaling controller 31 from the middlebox 36 over network connection 90 with the last packet copy 71' of the flow 38 received by the scaling controller 31 from the switch 18 over network connection 65.

In addition, an order-preserving move of state chunk 46 will include, in the flushing of the controller buffer 64 to the middlebox 34 of process block 66, a step indicated by process block 72 where the flushed packets from controller buffer 64 are tagged with a "do-not-buffer tag" causing them to be stored in a separate memory structure 74 of the middlebox 34 distinct from the middlebox buffer 42' of the middlebox 34.

At this point, when the state chunk 46 is fully transferred, the middlebox 34 may begin to process packets in memory structure 74, as indicated by process block 76, before processing the packets in the middlebox buffer 42. This processing of process block 76 continues until the last packet 71 previously forwarded from the scaling controller 31 middlebox has been processed. This requirement that the middlebox buffer 42' not be processed until receipt of the last packet 71 may require a slight delay until the last packet 71 is received.

Once the last packet 71 has been processed by middlebox 34, the middlebox 34 begins processing the middlebox buffer 42' as indicated by process block 78. In this way order of processing of the packets 40 is preserved such as may be important, for example, in an IDS that detects "weird activity" related to out-of-order packets.

Lossy Networks

The above system contemplates that the network 16 providing communication paths between the electronic computers 14 through the switches 18 is loss-less. If a certain degree of packet loss must be accommodated, for example, meaning packets 40 buffered by scaling controller 31 might not be received by the middlebox 34, this problem can be handled by using a TCP-based channel between the relevant devices, for example, the scaling controller 31 and middlebox 34. Transmission Control Protocol (TCP) provides mechanisms for preventing packet loss by retransmission, as defined in the Internet Engineering Task Force (IETF) Request for Comment (RFC) 793.

An additional problem may occur in a lossy network if the last packet 71 is not received by the middlebox 36 because of a loss along network path 53. In this case the last packet 71 is never received by the scaling controller 31 over network channel 90 which could cause it to wait indefinitely to begin releasing the buffer 64 per process block 66.

This problem can be avoided by the scaling controller 31 sending a tracer packet 79 per process block 84 to the switch 18 along network channel 65 with an instruction to send the packet to middlebox 36 along network path 53. This tracer packet 79 is sent immediately after rerouting of the flow 38 to middlebox 34 per process block 54. Accordingly, when that tracer packet 79 is received by the middlebox 36 it definitively must be the last packet 71 to arrive at middlebox 36 for flow 38.

Middlebox 36 sends the tracer packet 79 to the scaling controller 31 via network channel 90 when the tracer packet 79 is dequeued from the middlebox buffer 42 per process block 60. if the tracer packet 79 never shows up at the scaling controller 31 multiple tries can be provided by scaling controller 31 using multiple tracer packet 79.

Scaling down Middlebox Functionality

It will be appreciated that essentially the same steps described above may be performed in a scaling down operation with the exception of the instantiation of a new middlebox 34 at process block 35 (which is omitted in a scaling down) and the addition of a de-instantiation step 82 where the middlebox 36 is removed. In this case, the transfer of the state chunk 46 from middlebox 36 to middlebox 34 would encompass all flows currently being handled by middlebox 36. Upon that successful transfer of state chunk 46, as described above, middlebox 34 may then be deactivated.

It will be appreciated that the particular data paths and buffering locations described above are somewhat arbitrary; for example, the buffering of data from middlebox 36 of process block 60 may be accomplished by a different virtual machine including the virtual machines implementing the network functions. It will also be appreciated that as a result of virtualization, any central controller 29, scaling controller 31 or middlebox 34 or middlebox 36 may in fact be virtual instances on a single computing platform.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a machine" and "a virtual machine" or "a computer" and "a processor," can be understood to include one or more virtual machines or underlying processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A computing system comprising a plurality of computers interconnected with switches and executing program stored in non-transitory medium to implement enterprises using multiple machines intercommunicating with packets, the computing system comprising:
   (1) a central controller dynamical allocating machines to a given enterprise;
   (2) at least first and second middleboxes receiving a packet flow and collecting state information extracted from earlier packets in the flow and used for processing later packets in the flow received by the middlebox, the first and second middleboxes being instances of a common machine object; and
   wherein the computing system further executes the program to:
   (i) receive instructions to change a number of middleboxes and identify a given flow of packets to be received by the second middlebox;
   (ii) in response to the instructions, transfer state data of the first middlebox related to the given flow to the second middlebox; and
   (iii) in response to the instructions, control the switches to transfer ongoing packets of the given flow to the second middlebox;
   wherein the computing system further:
   begins buffering packets of the given flow of packets to the first middlebox before step (ii); and
   transfers the buffered packets of the given flow to the second middlebox after step (ii)
   wherein the instructions to change the number of middleboxes for the given flow of data provides at least one port number associated with the given flow.

2. A method of adjusting a number of middleboxes used in an enterprise using a computing system comprising a plurality of computers interconnected with switches and implementing machines intercommunicating with packets, the computing system having:
   (1) a first central controller dynamically allocating machines to a given enterprise;
   (2) at least a first and second middleboxes receiving a flow of packets and collecting state information extracted from earlier packets in the flow and used for processing later packets in the flow received by the middlebox, the first and second middleboxes being instances of a common machine object; and
   wherein the computing system:
   (i) receives instructions to change the number of middleboxes and identify a given flow of packets received by the first middlebox;
   (ii) in response to the instructions, transfer state data of the first middlebox related to the given flow to the second middlebox; and
   (iii) in response to the instructions, control the switches to transfer ongoing data packets of the given flow to the second middlebox;
   the method comprising:
   (i) receiving instructions to change the number of middleboxes and identifying a given flow of packets received by the first middlebox;
   (ii) in response to the instructions, transferring state data of the first middlebox related to the given flow to the second middlebox; and
   (iii) in response to the instructions, controlling the switches to transfer ongoing data packets of the given flow to the second middlebox;
   wherein the computing system further:
   begins buffering packets of the given flow of packets to the first middlebox before step (ii); and
   transfers the buffered packets of the given flow to the second middlebox after step (ii);
   wherein the second middlebox begins processing of the transferred packets before Processing of the ongoing packets of the given flow received by the second middlebox.

3. A computing system comprising a plurality of computers interconnected with switches and executing a program stored in non-transitory medium to implement enterprises using multiple machines intercommunicating with packets, the computing system comprising:
   (1) a central controller dynamically allocating machines to a given enterprise;
   (2) at least first and second middleboxes receiving a packet flow and collecting state information with respect to the flow, the state information used for processing the packets received by the middlebox, the first and second middleboxes being instances of a common machine object; and
   wherein the computing system further executes the program to:
   (i) receive instructions to change a number of middleboxes and identify a given flow of packets to be received by the second middlebox;
   (ii) in response to the instructions, transfer state data of the first middlebox related to the given flow to the second middlebox; and
   (iii) in response to the instructions, control the switches to transfer ongoing packets of the given flow to the second middlebox;
   wherein the computing system further:
   begins buffering packets of the given flow of packets to the first middlebox before step (ii); and
   transfers the buffered packets of the given flow to the second middlebox after step (ii);
   wherein the second middlebox begins processing of the transferred packets before processing of the ongoing packets of the given flow received by the second middlebox.

4. The computing system of claim 3 wherein the second middlebox provides separate storage locations for the buffered packets and the ongoing packets of the given flow received by the second middlebox.

5. The computing system of claim 3 wherein the buffered packets are marked to distinguish them from ongoing data packets of the given flow received by the second middlebox.

6. The computing system of claim 5 wherein the second middlebox receives an indication of a last buffered packet to initiate processing of the ongoing data packets of the given flow.

7. The computing system of claim 6 wherein the last buffered packet is a last packet of the flow received by the first middlebox after a completion of the transfer of the state data of the first middlebox related to the given flow to the second middlebox.

8. The computing system of claim 7 wherein the last packet is a tracer packet transmitted by the computing system to the first middlebox after controlling the switches to transfer ongoing data packets of the given flow to the second middlebox.

9. The computing system of claim 3 wherein each middlebox is associated with a different virtual electronic computer having a unique virtual processor and virtual memory.

10. The computing system of claim 3 wherein the common machine object is selected from the group consisting of: an intrusion detection system, a proxy cache, a wide area network optimizer, and a load balancer.

11. A computing system comprising a plurality of computers interconnected with switches and executing a program stored in non-transitory medium to implement enterprises using multiple machines intercommunicating with packets, the computing system comprising:
 (1) a central controller dynamically allocating machines to a given enterprise;
 (2) at least first and second middleboxes receiving a packet flow and collecting state information with respect to the flow, the state information used for processing the packets received by the middlebox, the first and second middleboxes being instances of a common machine object; and
wherein the computing system further executes the program to:
 (i) receive instructions to change a number of middleboxes and identify a given flow of packets to be received by the second middlebox;
 (ii) in response to the instructions, transfer state data of the first middlebox related to the given flow to the second middlebox; and
 (iii) in response to the instructions, control the switches to transfer ongoing packets of the, given flow to the second middlebox;
wherein the computing system further:
begins buffering packets of the given flow of packets to the first middlebox before step (ii); and
transfers the buffered packets of the given flow to the second middlebox after step (ii);
further including the step of de-instantiating the first middlebox upon the buffering of packets.

12. A computing system comprising a plurality of computers interconnected with switches and executing a program stored in non-transitory medium to implement enterprises using multiple machines intercommunicating with packets, the computing system comprising:
 (1) a central controller dynamically allocating machines to a given enterprise;
 (2) at least first and second middleboxes receiving a packet flow and collecting state information extracted from earlier packets in the flow and used for processing later packets in the flow received by the middlebox, the first and second middleboxes being instances of a common machine object; and
wherein the computing system further executes the program to:
 (i) receive instructions to change a number of middleboxes and identify a given flow of packets to be received by the second middlebox;
 (ii) in response to the instructions, transfer state data of the first middlebox related to the given flow to the second middlebox; and
 (iii) in response to the instructions, control the switches to transfer ongoing packets of the given flow to the second middlebox;
wherein the computing, system further:
begins buffering packets of the given flow of packets to the first middlebox before Step (ii); and
transfers the buffered packets of the given flow to the second middlebox after step (ii)
wherein the first middlebox, upon initiation of the transfer of state data related to the given flow to the second middlebox, ceases collecting state information with respect to the flow.

13. The computing system of claim 12 further including the step of instantiating the second middlebox upon receipt of the instructions.

14. The computing system of claim 12 wherein the instructions to change the number of middleboxes for the given flow of data packets provides at least one flow identification value contained in the packets.

* * * * *